(12) United States Patent
Hein

(10) Patent No.: US 8,165,025 B2
(45) Date of Patent: Apr. 24, 2012

(54) METHOD AND APPARATUS FOR GENERATING A UNIQUE PACKET IDENTIFIER

(75) Inventor: Richard W Hein, Burnaby (CA)

(73) Assignee: Ixia, Calabasas, CA (US)

( * ) Notice: Subject to any disclaimer, the term of this patent is extended or adjusted under 35 U.S.C. 154(b) by 669 days.

(21) Appl. No.: 11/608,263

(22) Filed: Dec. 8, 2006

(65) Prior Publication Data

US 2008/0137539 A1 Jun. 12, 2008

(51) Int. Cl.
*G06F 11/00* (2006.01)

(52) U.S. Cl. ........ 370/241; 709/223; 709/230; 712/205; 712/215; 370/216; 370/229; 370/503

(58) Field of Classification Search .................... 703/14; 705/8; 711/108–167; 713/160; 717/151; 370/252–394; 375/356; 463/31
See application file for complete search history.

(56) References Cited

U.S. PATENT DOCUMENTS

| | | | |
|---|---|---|---|
| RE31,407 E * | 10/1983 | Furtman et al. ............... 714/47.3 |
| 4,696,019 A * | 9/1987 | Tulpule et al. ................. 375/356 |
| 4,930,074 A * | 5/1990 | McCarthy ....................... 463/31 |
| 5,319,769 A * | 6/1994 | Muramatsu .................... 711/201 |
| 5,859,835 A * | 1/1999 | Varma et al. ................... 370/229 |
| 6,157,641 A * | 12/2000 | Wilford ......................... 370/389 |
| 6,292,764 B1 * | 9/2001 | Avery et al. ..................... 703/14 |
| 6,374,376 B1 * | 4/2002 | Byrd .............................. 714/718 |
| 6,515,967 B1 * | 2/2003 | Wei et al. ....................... 370/244 |
| 6,567,404 B1 * | 5/2003 | Wilford ......................... 370/389 |
| 6,598,139 B2 * | 7/2003 | Kawaguchi et al. ........... 711/167 |
| 6,714,552 B1 * | 3/2004 | Cotter ............................ 370/406 |
| 6,731,648 B1 * | 5/2004 | Cotter ............................ 370/458 |
| 6,807,156 B1 * | 10/2004 | Veres et al. ..................... 370/252 |
| 6,854,025 B2 * | 2/2005 | Knight et al. .................... 710/22 |
| 6,930,927 B2 * | 8/2005 | Pascucci ................... 365/185.29 |
| 6,934,796 B1 * | 8/2005 | Pereira et al. ................. 711/108 |
| 6,940,821 B1 * | 9/2005 | Wei et al. ....................... 370/244 |
| 6,963,847 B1 * | 11/2005 | Kennedy et al. ................... 705/8 |
| 7,039,790 B1 * | 5/2006 | Simar et al. .................... 712/215 |
| 7,290,134 B2 * | 10/2007 | Buer et al. ..................... 713/160 |
| 7,315,542 B2 * | 1/2008 | Gil et al. ........................ 370/392 |
| 7,408,878 B2 * | 8/2008 | Evans et al. .................... 370/232 |
| 7,440,443 B2 * | 10/2008 | Logvinov et al. .............. 370/352 |
| 7,581,082 B2 * | 8/2009 | Hahn et al. ..................... 712/206 |
| 7,673,119 B2 * | 3/2010 | Asal et al. ...................... 712/206 |
| 2003/0123447 A1 * | 7/2003 | Smith ............................ 370/394 |
| 2003/0172177 A1 * | 9/2003 | Kersley et al. ................. 709/236 |
| 2003/0235084 A1 * | 12/2003 | Zumkehr et al. .......... 365/189.05 |
| 2004/0008713 A1 * | 1/2004 | Knight et al. .................. 370/428 |
| 2007/0036129 A1 * | 2/2007 | Blanton ......................... 370/352 |
| 2007/0234327 A1 * | 10/2007 | Baxter et al. .................. 717/151 |
| 2007/0260942 A1 * | 11/2007 | Rajwar et al. .................... 714/54 |
| 2008/0137539 A1 * | 6/2008 | Hein .............................. 370/241 |
| 2009/0204692 A1 * | 8/2009 | Smith et al. .................... 709/221 |
| 2009/0327903 A1 * | 12/2009 | Smith et al. .................... 715/737 |

OTHER PUBLICATIONS

"Transmission Control Protocol," RFC 793, pp. 1-92 (Sep. 1981).

* cited by examiner

*Primary Examiner* — Backhean Tiv

(74) *Attorney, Agent, or Firm* — Jenkins, Wilson, Taylor & Hunt, P.A.

(57) ABSTRACT

A method and apparatus for generating a unique packet identifier from receive packet header information accepts a series of packet words that make up a packet and selects a subset of a first packet word and a subset of a second packet word. The unique packet identifier is generated from a combination of the subsets selected from the first and second packet words for each packet received.

9 Claims, 4 Drawing Sheets

METHOD AND APPARATUS FOR GENERATING A UNIQUE PACKET IDENTIFIER

BACKGROUND

A current challenge for network equipment and network service suppliers is testing and evaluating products under realistic network volume and conditions. Packet processing requires a priori knowledge of a current state of a connection associated with the packet to be processed. When processing protocol exchange packets, therefore, the packet header field provides information that is used to retrieve state information from memory. During operation, the devices that are tested maintain and process information for millions of connections. Therefore, realistic header fields are large. A look up function that uses a large number of bits to perform the addressing is complex and time-consuming and can potentially be a limiting factor in packet processing. It is important, therefore, to perform the retrieval step as efficiently as possible.

Prior art approaches to the retrieval step include a hardware implementation using content addressable memory (herein "CAM"). The hardware implementation using CAM is fast, but can be very expensive for a large number of connections. Additionally, CAM consumes significant printed circuit board real estate, which is also costly. Another prior art approach is a software implementation using sort algorithms. The software implementation is optimized for the specific sort involved, but is relatively slow and can be a limiting factor in the rate of packets processed. A hybrid implementation is also known involving a number of CAMs to create a hardware assisted search, however hybrid systems are expensive to implement on a large scale.

There remains a need, therefore, for efficient process and apparatus to perform the look up function of state information based upon packet header information.

BRIEF DESCRIPTION OF THE DRAWINGS

An understanding of the present teachings can be gained from the following detailed description, taken in conjunction with the accompanying drawings of which like reference numerals in different drawings refer to the same or similar elements.

DETAILED DESCRIPTION

In the following detailed description, for purposes of explanation and not limitation, example embodiments disclosing specific details are set forth in order to provide an understanding of embodiments according to the present teachings. However, it will be apparent to one having ordinary skill in the art and having benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments. Such methods and apparatus are clearly within the scope of the present teachings.

A specific embodiment of a tester according to the present teachings generates and measures "stateful" network traffic according to the DoD Standard Transmission Control Protocol as defined in Request For Comment 793 published September 1981 (herein "the TCP standard") including retransmission of segments that are not acknowledged and timeouts. Measurements made in a system according to the present teachings, therefore, include measurements relating to the quality of a connection within context at layer 3/4 of the Open Systems Interconnect model. In a specific embodiment, the tester generates TCP segments without regard to payload content, receives TCP segments, processes them according to the TCP standard retransmitting segments as dictated by the standard. A TCP connection is bi-directional, consists of two endpoints, and establishes a vehicle for communication via the TCP standard. In a specific embodiment, hardware circuitry, specifically a field programmable gate array ("FPGA") implements the TCP standard. To test and measure a greater number of connections to emulate a larger network, the tester is scaleable by simply adding state memory. The advantage of this scalability lies in the feature that an increase in the cost of the tester is relatively small relative to the overall system.

Figure 1:
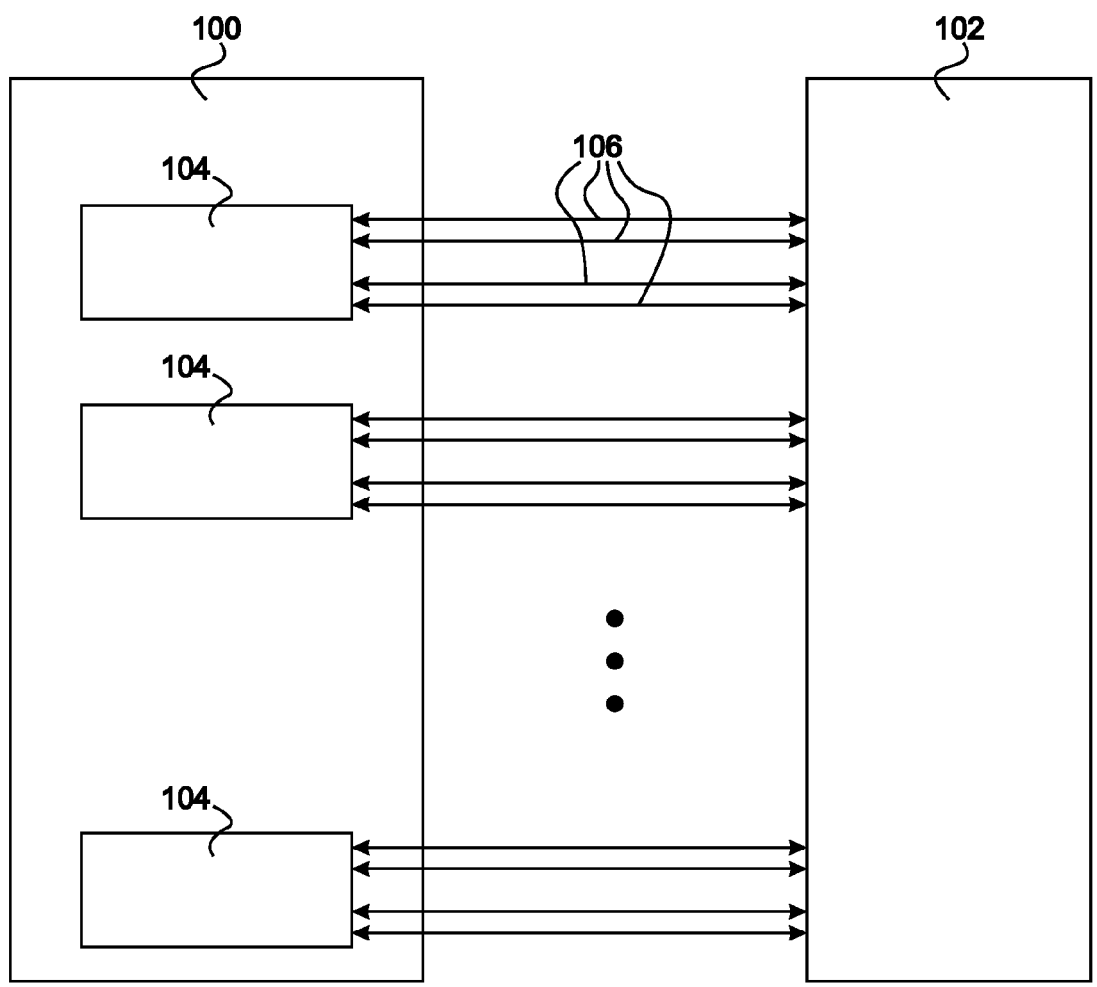
FIG. 1 illustrates connections between an embodiment of a tester according to the present teachings and a device under test.

With specific reference to FIG. 1 of the drawings, there is shown an illustration of connections between an embodiment of a tester 100 according to the present teachings and a device under test (herein "DUT 102"). In the example disclosed herein, the DUT 102 is a non-terminating TCP networking device that accepts TCP segments and forwards them. A specific embodiment of a tester according to the present teachings is able to measure the performance of the DUT as a networking device. Non-terminating DUTs include but are not limited to routers, switches, and edge aggregation devices. The tester 100 generates TCP traffic, receives the TCP traffic forwarded by the DUT, and measures the performance of the DUT in terms of whether it properly processes and forwards the TCP traffic it received according to the TCP standard. As one of ordinary skill in the art with benefit of the present teachings also appreciates that terminating devices may be tested as well. Examples of terminating devices include without limitation firewalls, servers, and web proxy devices. The present teachings are also applicable to other network standards in addition to the TCP standard.

FIG. 1 illustrates the tester 100 comprising multiple printed circuit boards (herein "PCB 104"). The tester 100 may use one or more of the PCBs 104 depending upon the size of the DUT 102 and the number of desired communication ports to be tested. In the specific embodiment illustrated, each printed circuit board 104 is able to accept four ports 106. Each port 106 provides full duplex communication and may be configured to be either a client port, a server port, or a combination client/server port. A server port is one where most of the data packets flow from the tester and to the device under test. The port remains full-duplex because there is control information flowing in both directions, but a bulk of the data flows from the tester to the device under test. A client port is one where most of the data communication flows from the device under test and to the tester. A client/server port is one where substantially equivalent volume of data traffic flows in both directions. In a specific implementation, there is always at least one server port or client/server port and one client port or client/server port for each tester 100, but the remaining two ports may be configured as client, server, or client/server as desired by a user.

Figure 2:
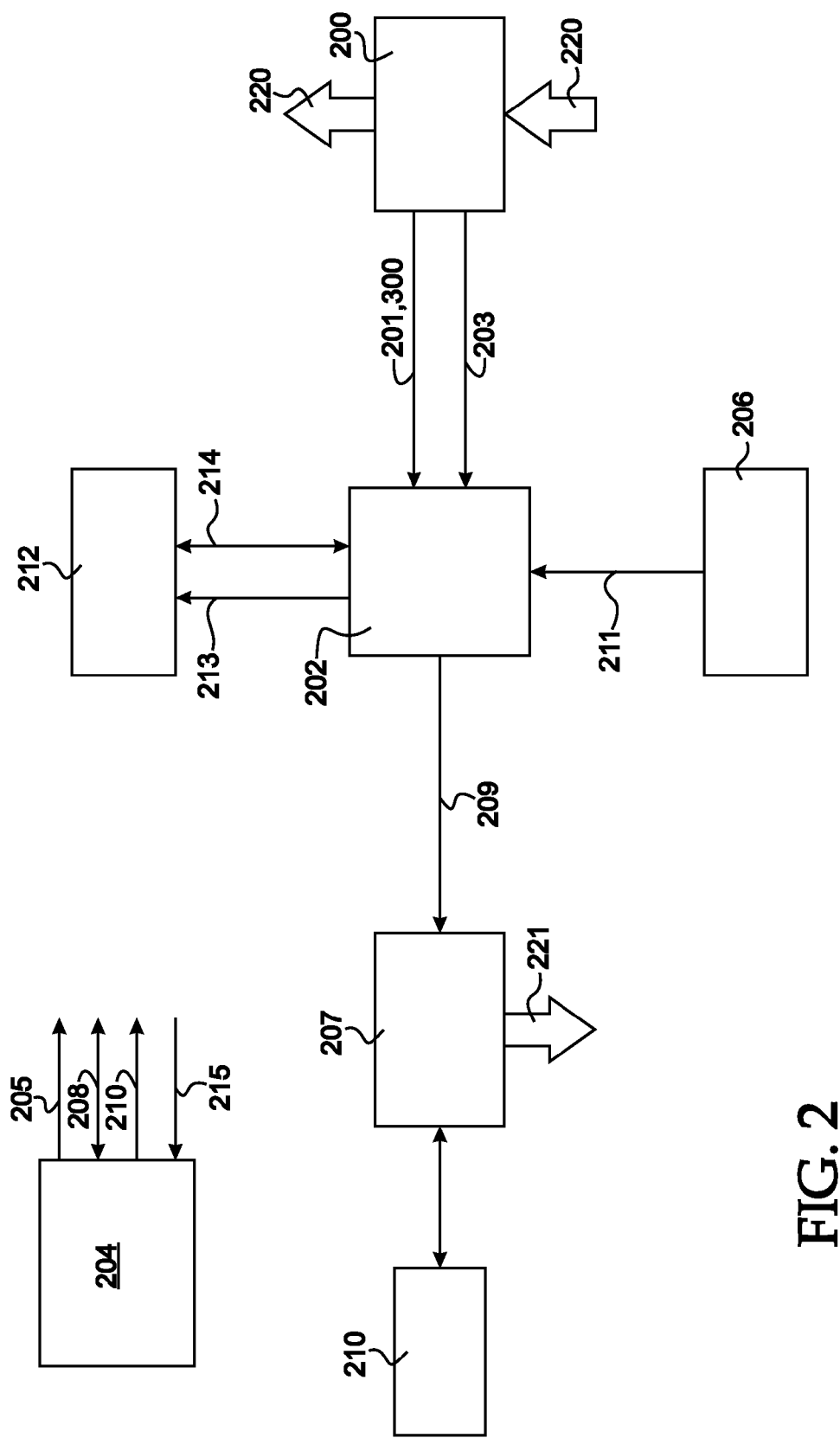
FIG. 2 illustrates an embodiment of a tester that supports one of the ports shown in FIG. 1 and benefits from the present teachings.

With specific reference to FIG. 2 of the drawings, there is shown a block diagram of an embodiment of tester logic that is used to support each port 106 of the client/server PCB 104 and obtains benefit from the present teachings. Packets in a received data stream 220 are received through the port 106 by a stream processor controller (herein "SPC 200"). The SPC 200 receives packets, identifies and filters certain packets from the received stream 220. The SPC 200 extracts receive packet header fields 201 and forwards them to Packet Processor 202. As it extracts the receive packet header fields 201, the SPC 200 also determines a unique packet identifier 300 that identifies a connection to which the packet is associated and sends it along with the header field 201. The SPC 200 indicates valid data in the receive packet header fields 201 to packet processor 202 with receive packet event signal 203. The SPC 200 then forwards the received data stream 220 to other circuitry unrelated to the present teachings.

The packet processor 202 accesses state memory 212 with state address 213 and state data 214. Rate generator 206 sends transmit packet requests 211 to the packet processor 202. The packet processor 202 sends outgoing packet header information 209 to packet generator 207. The packet generator 207 accesses templates stored in packet generator RAM 210 and uses the templates in conjunction with the outgoing packet header information 209 to generate a transmit packet for presentation as transmit data stream 221 to the port 106.

Central processing unit (herein "CPU") 204 is connected to all functional blocks 200, 202, 206, 207, 210, 212. The actual connections are not shown for purposes of clarity. The interaction between the CPU 204 and the functional blocks to which it communicates is through an address bus 205, a bi-directional data bus 208, a read/write signal 210 providing indication from the CPU 204 as to which direction data flows on the data bus and an acknowledgement signal 215 permitting the functional blocks to acknowledge completion of a transfer of information. The CPU 204 configures each of the functional blocks in preparation for a test. The CPU 204 is also able to dynamically modify test parameters during a test. The dynamically modifiable test parameters permit the tester to more closely emulate realistic TCP traffic and application behavior.

Figure 3:
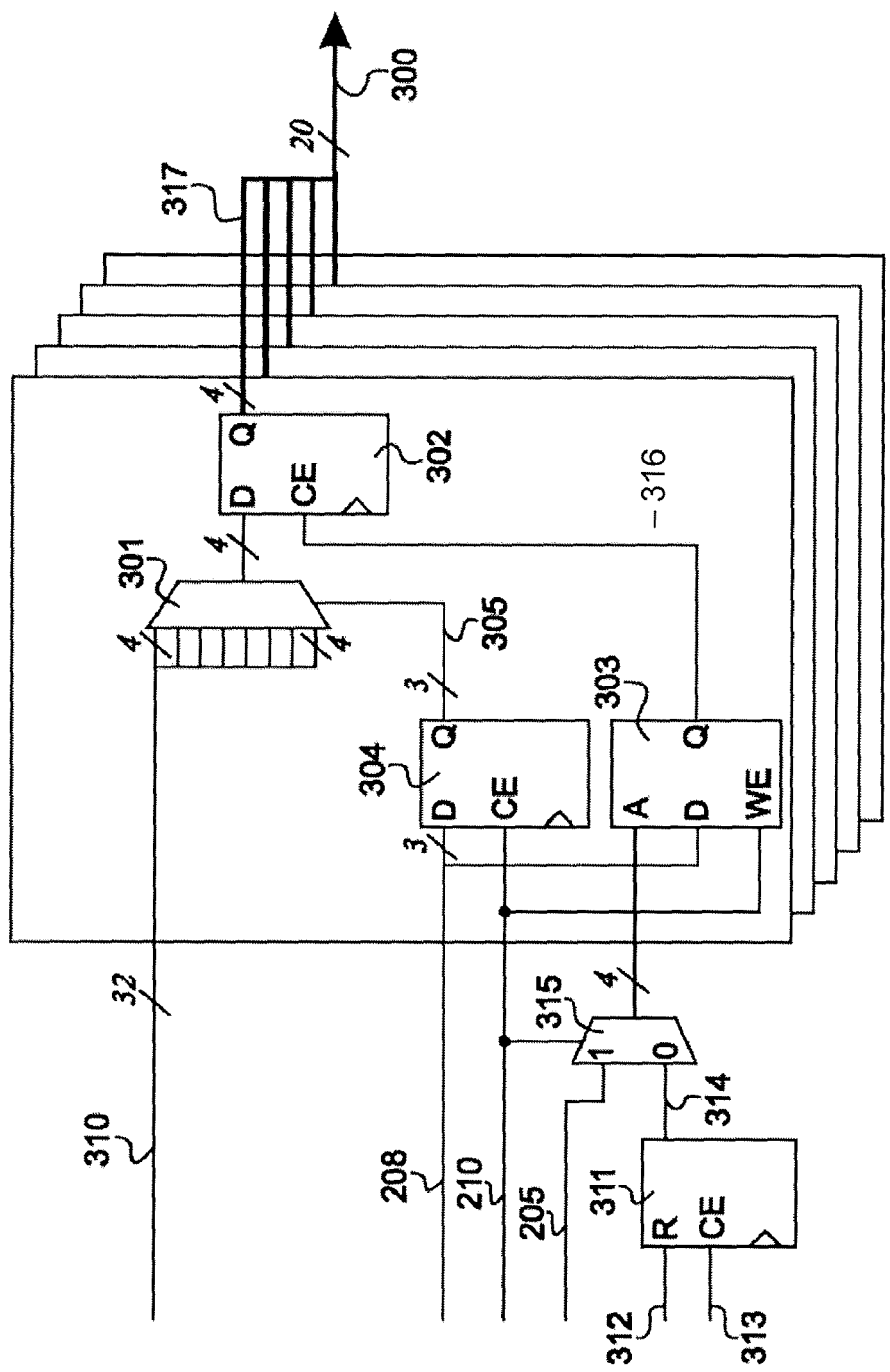
FIG. 3 is a block diagram of an embodiment according to the present teachings.

With specific reference to FIG. 3 of the drawings, there is shown an embodiment of logic according to the present teachings for determining a packet identifier 300 from each receive packet header field 201. The packet identifier 300 is used for purposes of addressing an appropriate location in the state memory 212. The present teachings are based on a principle that a test environment is different from normal operation of the device being tested in that there is some control over a range of possible packet identifiers. That being the case, the range of packet identifiers may be limited to a smaller predetermined range of values. Advantageously, the state memory 212 that supports the tester 100 may be smaller than might otherwise be necessary.

Using this principle to an advantage in the context of test, the present teachings propose to generate the packet identifier 300 from a subset of the receive packet header fields 201. Additionally, the subset is configurable by a user over an entire range of possible values.

FIG. 3 of the drawings illustrates a 32-bit implementation according to the present teachings in which there are five instantiations of logic. Each instantiation includes a respective field selector 301, a respective selector latch 302, respective enable RAM 303, and a respective CPU latch 304. An output of a single counter 311 is provided to each instantiation. An incoming packet in the data stream 220 is received as multiple packet words 310 that arrive in a time serial fashion.

In the specific embodiment shown in FIG. 3 of the drawings, there are sixteen (16) 32-bit packet words 310 in each receive packet header 201.

Each instantiation receives the same 32-bit packet word 310 at the same time, but processes each packet word 310 independently. Each instantiation outputs a 4-bit output. The collective outputs of all instantiations comprise the unique packet identifier 300, which is 20-bits in the specific implementation shown in FIG. 3.

Structure and operation of a single instantiation during a test is now described for processing one packet, wherein a system clock is received by the selector latch 302, the CPU latch 304, the counter 311, and the enable RAM 303. The system clock transitions as each packet word 310 is received and valid. In the specific 32-bit implementation, CPU latch output 305 maintains a 3-bit value programmed into it prior to test. The value of the CPU latch output 305 selects one of eight (8), 4-bit fields in the packet word 310 for presentation at an output of the field selector 301.

At a start of receipt for each packet, counter 311 is reset to zero via packet reset signal 312. As each subsequent packet word 310 in the packet is received, a logic one is maintained at the count enable signal 313 causing a next transition of the system clock to increment the counter 311 by one. During test, a counter output 314 is presented at an output of programming selector 315 that addresses the enable RAM 303. The enable RAM 303 is a 16 by 1-bit memory. The enable RAM 303 is programmed prior to test with only one of the 16 address locations storing a logic one. The address location that contains the logic one defines which one of the packet words 310 is used to generate the packet identifier 300 for each instantiation.

An enable RAM output 316 connects to a clock enable of the selector latch 302. As the counter 311 increments and cycles through the addresses of the enable RAM 303 as each packet word 310 is received, all but one cycle outputs a logic zero. A logic zero inhibits the selector latch 302 from presenting an output of the selector 301 to a selector latch output 317. Accordingly, on most cycles, the selector latch 302 does not propagate a value to the selector latch output 317.

One of the address locations of the enable RAM 303, however, stores a logic one. As the counter 311 increments through its cycle, the output of the enable RAM 303 is a logic one for one of the cycles. When the location storing the logic one is addressed, a logic one is presented to the clock enable of the selector latch 302. While the clock enable is asserted on the selector latch 302, the next transition of the system clock causes the 4-bit output of the field selector 301 to be propagated to a selector latch output 317. The latched value at the selector latch output 317 remains because all remaining address locations store a logic zero, thereby disabling the clock enable of the selector latch 302 until all remaining packet words 310 of the current packet are processed.

After all of the packet words 310 are processed for one packet, each of the five instantiations has a latched 4-bit output 317. As one of ordinary skill in the art appreciates, each instantiation most typically presents a different subset of different packet words 310 at the selector latch output 317. A composite of the five 4-bit outputs 317 for each instantiation comprises a unique identifier 300 for the packet. The unique identifier 300 may then be used by the packet processor 202 to access the state memory 212.

Structure and operation for programming a single instantiation prior to test is now described, wherein the CPU latch 304 and the programming selector 315 permit the CPU to programmatically select those packet words 310 and fields of the receive packet header field 201 that are to be used to generate the unique identifier 300. Specifically, the CPU 204 performs a routine that stores a 3-bit code into the CPU latch 304. CPU data 208 with the desired value is presented to the CPU latch 304. The CPU read/write signal 210 is then asserted to propagate and hold the CPU data 208 at the output of the CPU latch 304. Each instantiation is independent of the others in that each 3-bit code may be, but is not necessarily, different from all other instantiations. The CPU latch output 305 defines which field is selected for the packet word 310. Once each CPU latch is programmed by the CPU 204, the values are held constant by de-asserting the CPU read/write signal 210.

The enable RAM 303 is also programmed by the CPU 204 prior to test by storing a logic one in one of 16 address locations and storing a logic zero in all remaining address locations. In a specific embodiment, the CPU 204 writes to the enable RAM 303 by asserting the CPU read/write signal 210 and incrementing through each one of the 16 address locations via CPU address bus 205. The asserted CPU read/write signal 210 causes CPU selector 315 to present the CPU address 205 at its output instead of the output of the counter 311 and also causes data to be written to the enable RAM 303.

After programming the enable RAM 303, only one of the 16 address locations stores a logic one. The location of the logic one defines the packet word 310 that is to be used as part of the packet identifier 300. During test, the CPU read/write signal 210 remains de-asserted and the CPU signals 208, 205 are not relevant to operation of each instantiation during test. It is also to be noted that a de-asserted read/write signal 210 causes CPU selector 315 to pass through the counter output 314 while also inhibiting alteration of stored values in the CPU latch 304 and the enable RAM 303.

Figure 4:
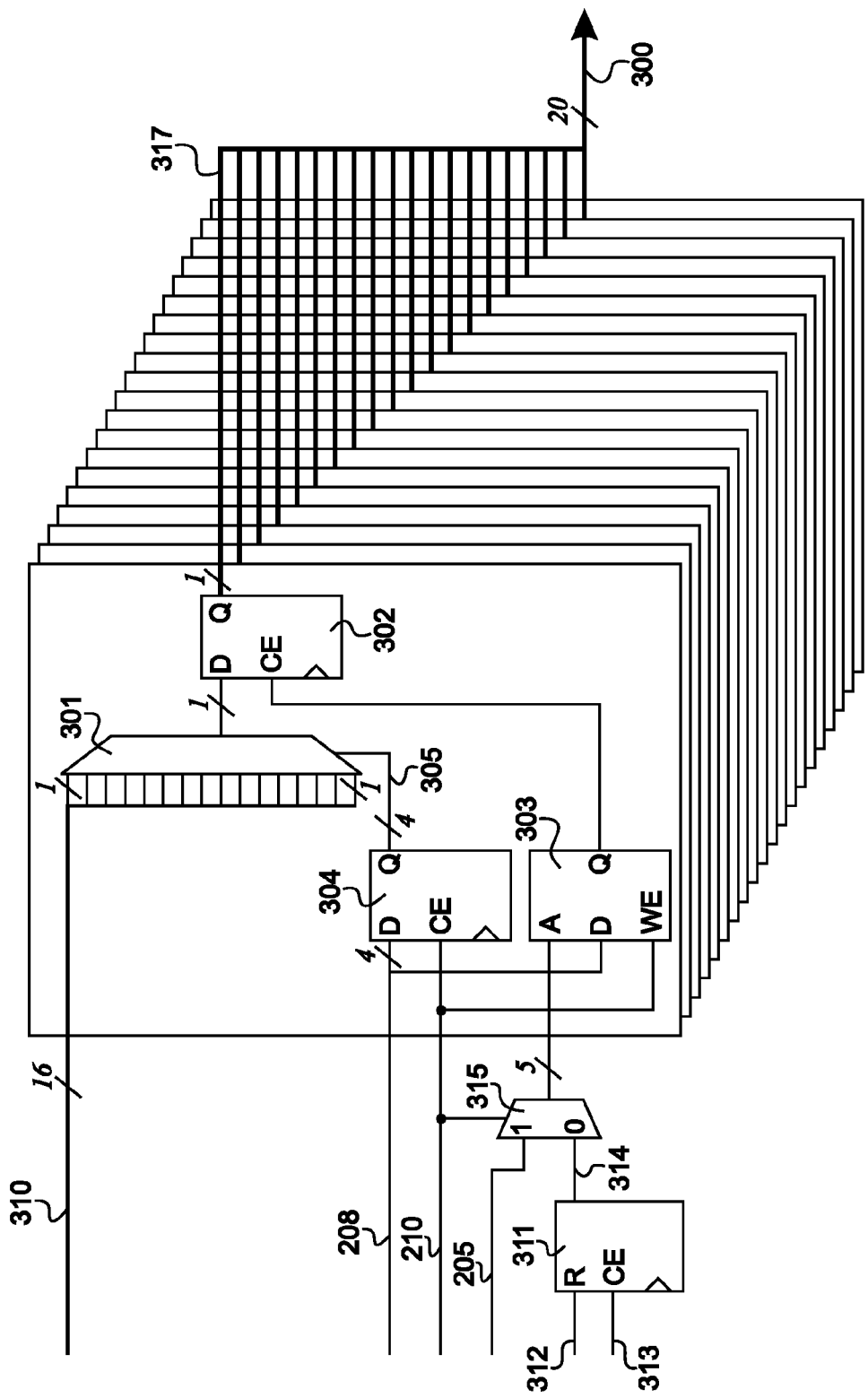
FIG. 4 is a block diagram of an alternative embodiment according to the present teachings.

With specific reference to FIG. 4 of the drawings, there is shown an alternative embodiment of an apparatus according to the present teachings that includes 20 instantiations, each instantiation presenting a 1-bit selector latch output 317 to contribute to the collective packet identifier 300. In the embodiment of FIG. 4, each instantiation processes a total of 32, 16-bit packet words 310 for each packet. The CPU latch 304 is programmed with a 4-bit value to direct which one of 16 possible one bit fields is presented at the output of the selector 301 and propagated to the selector latch output 317. In the embodiment relevant to FIG. 4 of the drawings, the enable RAM 303 has 32 1-bit locations that are cycled through using a 5-bit counter 311 to select which packet word 310 is used for each instantiation. As one of ordinary skill in the art appreciates, the embodiment of FIG. 4 is programmed in similar fashion to the embodiment of FIG. 3 except for differences in the numbers of bits programmed and processed.

Embodiments of the teachings are described herein by way of example with reference to the accompanying drawings describing a method and apparatus for generating a unique packet identifier from receive packet header information in a tester that makes measurements on network traffic. Other variations, adaptations, and embodiments of the present teachings will occur to those of ordinary skill in the art given benefit of the present teachings.

The invention claimed is:

1. A method comprising:
    in a network traffic tester device:
    accepting, from a networking device under test (DUT) in a test environment, a packet that includes a packet header comprising a serial plurality of packet words,
    selecting a subset of a first packet word in the packet header,
    selecting a subset of a second packet word in the packet header,
    selecting a subset of an Nth packet word in the packet header,
    generating a packet identifier from a combination of the subsets selected from the first, second, and Nth packet words in the packet header, wherein the packet identifier identifies a connection between the network traffic tester device and the networking DUT in the test environment to which the packet is associated, and
    accessing a state memory using the packet identifier.

2. A method as recited in claim 1 repeating accepting, selecting, and generating for a serial plurality of packets in a data stream.

3. A method as recited in claim 1 implemented in a series of instantiations and wherein each instantiation performs a different one of the selecting.

4. A method as recited in claim 1 comprising programming at least one bit used to select the subset of each of the first packet word, the second packet word, and the Nth packet word.

5. A method as recited in claim 1 comprising programming at least one bit to define the first packet word, the second packet word, and the Nth packet word from the serial plurality of packet words.

6. An apparatus comprising:
    a network traffic tester device including:
    a stream processor controller port for accepting, from a networking device under test (DUT) in a test environment, a packet that includes a packet header comprising a serial plurality of packet words,
    a first field selector for selecting a subset of a first packet word in the packet header,
    a second field selector for selecting a subset of a second packet word in the packet header,
    an Nth field selector for selecting a subset of an Nth packet word in the packet header,
    a plurality of selector latches for generating a packet identifier from a combination of the subsets selected from the first, second, and Nth packet words in the packet header, wherein the packet identifier identifies a connection between the network traffic tester device and the networking DUT in the test environment to which the packet is associated, and
    a packet processor for accessing a state memory using the packet identifier.

7. An apparatus as recited in claim 6 and further comprising a programming selector for programming at least one bit to define the first packet word, the second packet word, and the Nth packet word from the serial plurality of packet words.

8. A network traffic testing apparatus comprising:
    means for accepting, from a networking device under test (DUT) in a test environment, a packet that includes a packet header comprising a serial plurality of packet words,
    means for selecting a subset of a first packet word in the packet header,
    means for selecting a subset of a second packet word in the packet header,
    means for selecting a subset of an Nth packet word in the packet header,
    means for generating a packet identifier from a combination of the subsets selected from the first, second, and Nth packet words in the packet header, wherein the packet identifier identifies a connection between the network traffic tester device and the networking DUT in the test environment to which the packet is associated, and means for accessing a state memory using the packet identifier.

9. An apparatus as recited in claim 8 comprising means for programming at least one bit to define the first packet word, the second packet word, and the Nth packet word from the serial plurality of packet words.

* * * * *